US005957696A

United States Patent [19]

Kageyama

[11] Patent Number: 5,957,696

[45] Date of Patent: Sep. 28, 1999

[54] KARAOKE APPARATUS ALTERNATELY DRIVING PLURAL SOUND SOURCES FOR NONINTERRUPTIVE PLAY

[75] Inventor: Yasuo Kageyama, Hamamatsu, Japan

[73] Assignee: Yamaha Corporation, Hamamatsu, Japan

[21] Appl. No.: 08/813,694

[22] Filed: Mar. 7, 1997

[30] Foreign Application Priority Data

Mar. 7, 1996 [JP] Japan .................................... 8-050181

[51] Int. Cl.$^{6}$ .............................. G09B 15/02; G10H 1/36

[52] U.S. Cl. ........................ 434/307 A; 434/318; 84/609; 84/610; 348/17; 360/69

[58] Field of Search ................................ 434/307 R–309, 434/318, 365; 84/477 R, 601, 603, 609, 610, 625, 630, 631, 634, 645, 649; 360/32, 33.01, 48, 69, 70, 77.01, 98.04; 369/22, 30, 32, 34, 48, 50, 83, 178, 192; 348/17, 78, 488, 552, 569, 571, 678, 688; 345/141, 143, 147; 381/51, 63, 81; 380/3

[56] References Cited

U.S. PATENT DOCUMENTS

| | | | |
|---|---|---|---|
| 5,247,126 | 9/1993 | Okamura et al. | 434/307 A |
| 5,453,570 | 9/1995 | Umeda et al. | 84/477 R X |
| 5,454,723 | 10/1995 | Horii | 360/32 X |
| 5,574,239 | 11/1996 | Kang et al. | 84/610 |
| 5,631,433 | 5/1997 | Iida et al. | 84/610 |
| 5,683,253 | 11/1997 | Park et al. | 369/32 X |
| 5,796,913 | 8/1998 | Takada et al. | 360/69 X |
| 5,808,223 | 9/1998 | Kurakake et al. | 434/307 A X |
| 5,863,206 | 1/1999 | Narusawa et al. | 434/307 A |
| 5,880,388 | 3/1999 | Kajiyama et al. | 84/649 X |
| 5,890,910 | 4/1999 | Tsurumi et al. | 348/552 X |

*Primary Examiner*—Joe H. Cheng
*Attorney, Agent, or Firm*—Pillsbury Madison & Sutro LLP

[57] ABSTRACT

A karaoke apparatus is constructed to reproduce a karaoke music piece according to karaoke data composed of setup data and performance data. The karaoke apparatus utilizes a pair of sound source devices each of which is initialized according to the setup data and is then operated to reproduce the karaoke music piece according to the performance data so that the sound source devices can be alternately operated with each other to successively reproduce a plurality of karaoke music pieces. In the karaoke apparatus, a first control device operates when one of the sound source devices reproduces a preceding one of the karaoke music pieces for providing the other of the sound source devices with setup data contained in karaoke data corresponding to a succeeding one of the karaoke music pieces so as to initialize the other sound source device before the one sound source device finishes reproduction of the preceding karaoke music piece. Further, a second control device operates when the one sound source device finishes the reproduction of the preceding karaoke music piece for providing the other sound source device with performance data of the succeeding karaoke music piece so as to operate the other sound source device to reproduce the succeeding karaoke music piece immediately after the one sound source device finishes the reproduction of the preceding karaoke music piece.

7 Claims, 5 Drawing Sheets

KARAOKE APPARATUS ALTERNATELY DRIVING PLURAL SOUND SOURCES FOR NONINTERRUPTIVE PLAY

BACKGROUND OF THE INVENTION

1. Field of the Invention

The present invention relates to a karaoke apparatus for playing a plurality of requested karaoke music pieces continuously or noninterruptively with a negligibly short interval between successive ones of the requested music pieces.

2. Description of Related Art

In a karaoke apparatus, a music piece can be reserved while a preceding music piece is being played back. The reserved music piece is automatically started after termination of the preceding music piece. Recent karaoke apparatuses are so-called "tone-generator-based karaoke apparatus" in which karaoke performance data drives a tone generator to synthesize or generate a musical tone signal. The tone generator is capable of generating musical tones having a variety of synthetic timbres by setting control parameters, thereby allowing the karaoke apparatus to reproduce or play back karaoke music of any genre by generating suitable musical tones.

However, the number of control parameters for setting the tone generator is so great that it takes about 10 seconds for initializing or setting up the tone generator by transmitting the control parameters to the tone generator before starting karaoke playing. As shown in FIG. 6, in successive playing of plural pieces A and B of karaoke music, the control parameters arranged for the succeeding piece B of karaoke music must be set in the tone generator before starting the music piece B after termination of the preceding music piece A, reesulting in a wait interval of 10 seconds between the two pieces A and B for resetting or initializing the tone generator. Often, this relatively long wait interval has affect of discouraging a karaoke singer's lyrical mood created so far.

SUMMARY OF THE INVENTION

It is therefore an object of the present invention to provide a karaoke apparatus that overcomes the above-mentioned drawbacks inherent to the prior art karaoke apparatuses by making preparations during playing of one karaoke musical piece by one sound source device for the start of playing another karaoke musical piece by another sound source device.

The inventive karaoke apparatus is constructed to reproduce a karaoke music piece according to karaoke data composed of setup data and performance data. The karaoke apparatus comprises a plurality of sound source devices each of which is initialized according to the setup data and is then operated to reproduce the karaoke music piece according to the performance data so that the sound source devices can be alternately operated with each other to successively reproduce a plurality of karaoke music pieces, a first control device operative when one of the sound source devices reproduces a preceding one of the karaoke music pieces for providing another of the sound source devices with setup data contained in karaoke data corresponding to a succeeding one of the karaoke music pieces so as to initialize said another sound source device before said one sound source device finishes reproduction of the preceding karaoke music piece, and a second control device operative when said one sound source device finishes the reproduction of the preceding karaoke music piece for providing said another sound source device with performance data contained in the karaoke data corresponding to the succeeding karaoke music piece so as to operate said another sound source device to reproduce the succeeding karaoke music piece immediately after said one sound source device finishes the reproduction of the preceding karaoke music piece.

In a specific form, each sound source device includes a tone generator which generates musical tones having suitable timbres arranged in matching with the karaoke music piece to be reproduced by each sound source device so that the first control device provides each sound source device with the setup data effective to initialize the tone generator to create the suitable timbres and the second control device provides each sound source device with the performance data effective to operate the tone generator to generate the musical tones having the suitable timbres to thereby reproduce the karaoke music piece. Further, each sound source device includes a digital signal processor which imparts suitable effects to the karaoke music piece to be reproduced by each sound source device so that the first control device provides each sound source device with the setup data effective to initialize the digital signal processor to create the suitable effects. Moreover, the karaoke apparatus further comprises a reservation device which reserves requests for a plurality of karaoke music pieces and which commands the first control device and the second control device to alternately operate the plurality of the sound source devices to successively reproduce the reserved karaoke music pieces in the order of the requests.

As described, the karaoke apparatus according to the invention has a plurality of sound source devices. When one sound source device is activated for making karaoke performance, another sound source device reads setup data of a succeeding piece of karaoke music to prepare for the next karaoke playing. This preparation tales about 10 seconds in general. The setup preparation in advance allows the immediate playing of the next karaoke music piece upon termination of the playing of the preceding karaoke music piece, thus preventing the karaoke singer's lyrical mood from being discouraged by a wait interval which would be created between the two pieces of karaoke music in the conventional karaoke apparatus.

The above and other objects, features and advantages of the present invention will become more apparent from the accompanying drawings, in which like reference numerals are used to identify the same or similar parts in several views.

DETAILED DESCRIPTION OF PREFERRED EMBODIMENTS

This invention will be described in further detail by way of example with reference to the accompanying drawings. The karaoke apparatus according to the invention incorporates a plurality of tone generators for electronically synthesizing musical tone signals. The karaoke data for karaoke playing contains performance data representative of musical events and setup data representative of control parameters for driving and controlling the tone generators. In karaoke playing, the initializing control parameters (namely, setup data) included in the karaoke data are first transmitted to a sound source system containing the tone generator to set up the same, and the performance data are inputted in the tone generator according to a prescribed time sequence to form a musical tone signal.

The karaoke apparatus according to the invention has two sound source systems (system a and system b). The setting of the above-mentioned control parameters to the tone generator contained in the sound source system takes about 10 seconds. It is undesirable that an idling interval as long as ten seconds is inserted between a preceding musical piece and a succeeding musical piece when these musical pieces are reserved for successive playing. In the two-system constitution, while one sound source system is playing back a piece of karaoke music, control parameters customized to a next piece are set up on the other sound source system. Upon termination of playing of the preceding piece by the one system, playing of the next piece is started by the other system, thereby removing the above-mentioned undesirable idling or waiting interval.

Figure 1:
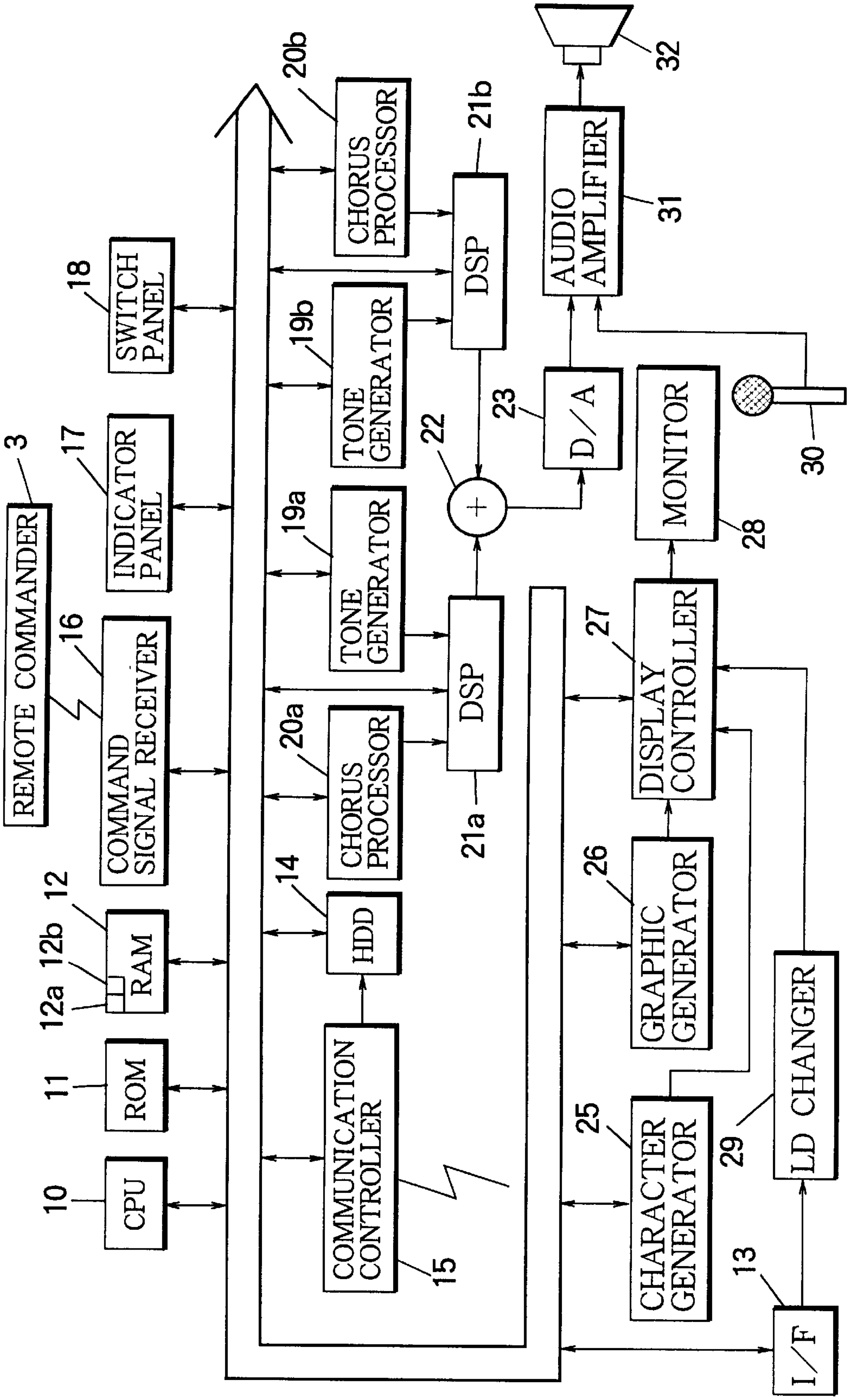
FIG. 1 is a block diagram illustrating a tone-generator-based karaoke apparatus practiced as one preferred embodiment of the present invention.

Now, referring to FIG. 1, there is shown a block diagram illustrating the inventive tone-generator-based karaoke apparatus. A CPU 10 for controlling entire operation of the apparatus is connected via a bus to those of a ROM 11, a RAM 12, an external interface (I/F) 13, a hard disk drive (HDD) 14, a communication controller 15, a command signal receiver 16, an indicator panel 17, a switch panel 18, a pair of tone generators 19*a* and 19*b*, a pair of chorus processors 20*a* and 20*b*, a pair of digital signal processors (DSPs) 21*a* and 21*b*, a character generator 25, a graphic generator 26, and a display controller 27. The external interface 13 is connected to an LD (Laser Disc) changer 29. Thus, the karaoke apparatus according to the present invention has two sound source systems (the system a and the system b) for karaoke playing. The one system a is composed of the tone generator 19*a*, the chorus processor 20*a*, and the DSP 21*a*. The other system b is composed of the tone generator 19*b*, the chorus processor 20*b*, and the DSP 21*b*. The DSPs 21*a* and 21*b* are connected to a mixer 22, which is in turn connected to a D/A converter 23. The audio output terminal of the D/A converter 23 is connected to an audio amplifier 31 which is an external device. The audio amplifier 31 is connected to a vocal microphone 30 and a loudspeaker 32. The display controller 27 is connected to an externally attached monitor 28.

The ROM 11 stores an operating system program, application programs, a loader, font data and so on. The operating system program controls the basic operation of the karaoke apparatus and the data transfer with peripheral equipments. The application programs include peripheral equipment control programs and a sequence program. The sequence program is executed in karaoke playing to output the karaoke data stored in reserved data areas 12*a* and 12*b* of the RAM 12 to either of the tone generators 19*a* and 19*b*, to generate a musical tone signal. Further, the karaoke data is fed to the character generator 25 to display lyrics of a karaoke music piece being played. The loader is executed to download the karaoke data and so on for karaoke playing from a karaoke data server (not shown) via the communication controller 15. The font data are used to display the lyrics and titles of karaoke musical pieces. The font data include a plurality of font types such as Mincho (generally equivalent to the serif typeface style in Western typography) and Gothic. The RAM 12 is provided with the two reserved data areas 12*a* and 12*b* for storing the karaoke data of the reserved musical pieces which are retrieved from the HDD 14. While the karaoke data stored in the area 12*a* is being reproduced by the sound source system a, the karaoke data of a next reserved piece of karaoke music is read from the HDD 14 to the area 12*b*, and the control parameters included in the karaoke data stored in the area 12*b* are inputted into the other sound source system b to set up or initialize the same in advance. The RAM 12 also stores a list of reserved music pieces that lists a plurality of codes of the reserved music pieces.

The communication controller 15 downloads the karaoke data for karaoke playing from the remote karaoke data server and writes the downloaded karaoke data into the HDD 14. The communication controller 15 incorporates a DMA (Direct Memory Access) circuit so that the downloaded karaoke data can be written directly to the HDD 14 without transferring the data to the CPU 10. The HDD 14 is provided with a karaoke data storage area for storing about 10,000 pieces of the downloaded karaoke data.

The command signal receiver 16 receives an infrared signal transmitted from the remote commander 3 and restores command data carried by the signal to its original form. The remote commander 3 has key switches such as numeric keys and a mode select key. Operating these keys causes the remote commander 3 to transmit infrared signals modulated by corresponding codes. By actuating appropriate keys, the user can enter desired codes of karaoke music pieces into the karaoke apparatus for reservation. The indicator panel 17 includes an LED display device for displaying such information as inputted codes of karaoke music pieces. The switch panel 18 includes numeric keys and other keys generally the same as those provided on the remote commander 3. The codes of karaoke musical pieces may also be inputted from this switch panel 18.

The following describes one of the two sound source systems a and b, and the other has the same configuration. The tone generator 19*a* forms a musical tone signal based on event data inputted from the CPU 10 at karaoke playing. The event data are written in a musical sound track of the karaoke data to control sounding and muting of a musical tone. The tone generator 19*a* may be of wave table type, FM type or VA type. The chorus processor 20*a* forms a voice signal representing a background chorus based on voice data. The voice data are prepared by performing adaptive differential phase code modulation (ADPCM) of a signal representing a row chorus voice into digital signal waveforms. The background chorus can hardly be generated or synthesized electronically by the tone generator 19*a*. The chorus processor 20*a* decompresses the ADPCM voice data, modulates the pitch thereof and outputs the resultant signal. The DSP 21*a* imparts various effects to the musical tone signal inputted from the tone generator 19*a* and the voice signal decompressed by the chorus processor 20*a*. The resultant karaoke sound is outputted to the mixer 22. It should be noted that types and degrees of the effects given by the DSP 21*a* are controlled by DSP control data inputted from the CPU 10. The DSP control data are prescribed in a DSP control track of the karaoke data together with delta time data, and are read by the CPU 10 at predetermined karaoke playing timings to drive or operate the DSP 21*a*.

The mixer 22 may mix the karaoke sound signal inputted from the DSP 21*a* and the DSP 21*b*, if necessary, at an appropriate ratio, and outputs the resultant signal to the D/A converter 23. The D/A converter 23 converts this digital karaoke sound signal to an analog audio signal and outputs the converted analog audio signal to the external audio amplifier 31. The audio amplifier 31 mixes this karaoke audio signal with a singing voice signal inputted from the microphone 30 at an appropriate ratio, then amplifies the mixed signal, and outputs the amplified signal to the speaker 32.

The character generator 25 receives word display data for displaying the title and lyrics of a karaoke musical piece. The word display data are written in a word display track of the karaoke data and implemented along with time interval data (delta time data) such that the title and lyrics are displayed on the monitor 28 and display colors thereof are altered in synchronization with the karaoke playing which is performed based on the musical sound track. The character generator 25 generates a character pattern for the lyrics and so on based on the word display data. On the other hand, the background graphic generator 26 generates graphic patterns such as a title scene at the beginning of a karaoke musical piece, a confirmation scene of reservation, a confirmation scene of tempo change, and a harmony setting scene. The LD changer 29 reproduces background images from a laser disc in karaoke playing. The CPU 10 determines which background image is to be reproduced according to genre data and so on of the karaoke musical piece to be played, and transmits a chapter number of the determined background image to the LD changer 29 via the external interface 13. The LD changer 29 selects the image corresponding to the chapter number specified by the CPU 10 among various images recorded in a plurality of laser discs (about five in general), and reproduces the selected image. The character pattern generated by the character generator 25, the graphic pattern generated by the graphic generator 26, and the background image reproduced by the LD changer 29 are inputted altogether into the display controller 27. The display controller 27 superposes the character pattern and the graphic pattern on the background image and displays the resultant graphics on the monitor 28.

Figure 2:
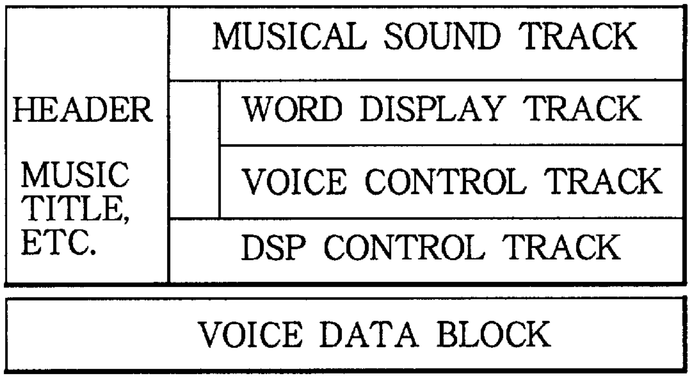
FIG. 2 is a diagram illustrating configuration of musical data of a karaoke music piece played back by the karaoke apparatus of FIG. 1.

Referring to FIG. 2, general configuration of the karaoke data is illustrated. In addition to the musical sound track for karaoke playing, the karaoke data are composed of tracks such as a word display track, a voice control track, a DSP control track, a voice data block and a header. The header is composed of various data including a music code, a music title, a release date and a playing duration associated with a corresponding musical piece. The genre data of a particular piece of karaoke music may be either included in the header or prepared as separate data.

The musical sound track is implemented with performance data for generating an orchestral accompaniment (karaoke) of the musical piece for karaoke playing, and is composed of a plurality of subtracks for a plurality of parts such as piano, strings, and rhythm. The performance data is composed of event data for indicating sounding and muting of musical tones and delta time data representing a read timing of these even data in the form of a time interval between adjacent ones of note event data. In addition to the note event data for indicating sounding and muting of musical tones (namely, note-on event data and note-off event data), the event data include change data for adjusting and changing timbres (namely, parameter change data and program change data). The leading or top section of this musical sound track is written with initializing control parameters as setup data for resetting and initializing the tone generator 19*a* or 19*b* and the DSP 21*a* or 21*b* before starting karaoke playing. These setup data are read out before starting karaoke playing which is carried out by sequential reading of all parallel tracks in synchronization with a tempo clock signal. In the karaoke playing, the delta time data is counted in response to the tempo clock. When the delta time data is counted up, next event data is read out and transmitted to the tone generator 19*a* or 19*b*.

The word display track records character sequence data representative of the title and lyrics of the karaoke musical piece, and is composed of phrase event data and delta time data indicating a time interval between adjacent ones of the phrase event data. It should be noted that the data recorded on this word display track are not general-purpose MIDI data; however, in order to make the implementation processes consistent to facilitate preparation of the karaoke data, the voice control track and the DSP control track are all written in MIDI format as well as this word display track. The word display track includes the phrase event data representative of one line of the lyrics, coordinates data for displaying the lyrics, and wipe sequence data for controlling color change and erasure of the displayed phrase.

The voice control track controls a reproduction timing of background choruses of plural types stored in the voice data block, and is composed of voice designation event data and delta time data. The voice designation event data designates one of voice data which is to be shifted to a given frequency and which is to be sounded at a given volume level.

The DSP control track is recorded with event data for controlling operation of the DSP 21*a* and the DSP 21*b*, and associated delta time data. The event data indicates which type of effect is to be applied to a musical sound signal at a given degree. Likewise the musical sound track, the leading section of this DSP control track is written with setup data for resetting and initializing either of the DSP 21*a* and DSP 21*b*.

When commencing karaoke playing, the above-mentioned musical sound track, word display track, voice control track, DSP control track, and additional control information track are read out in synchronization with the common clock signal. The various event data are fed to corresponding operating devices such as the tone generator and the DSP.

Figure 3:
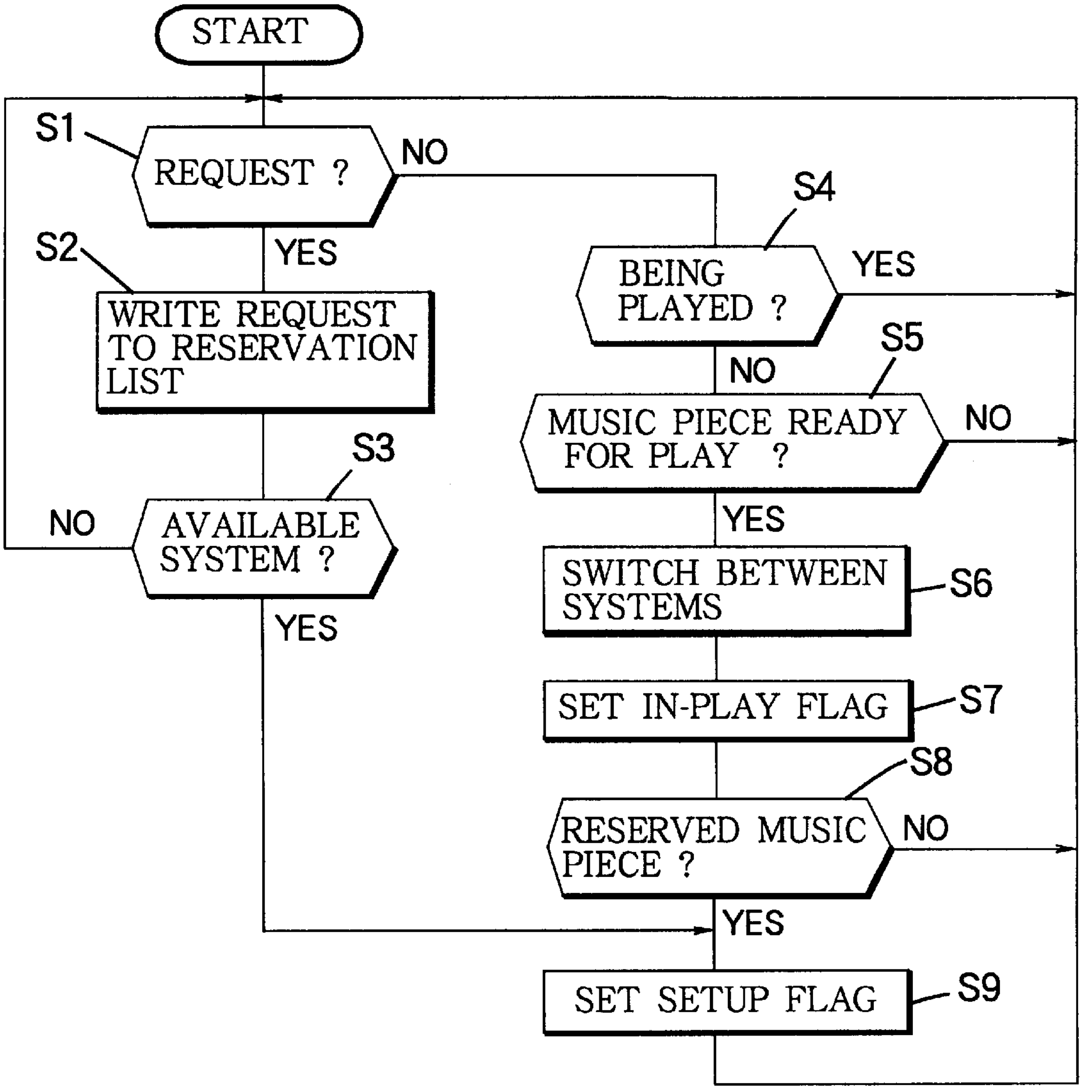
FIG. 3 is a flowchart describing operation of the karaoke apparatus of FIG. 1.
Figure 4A:
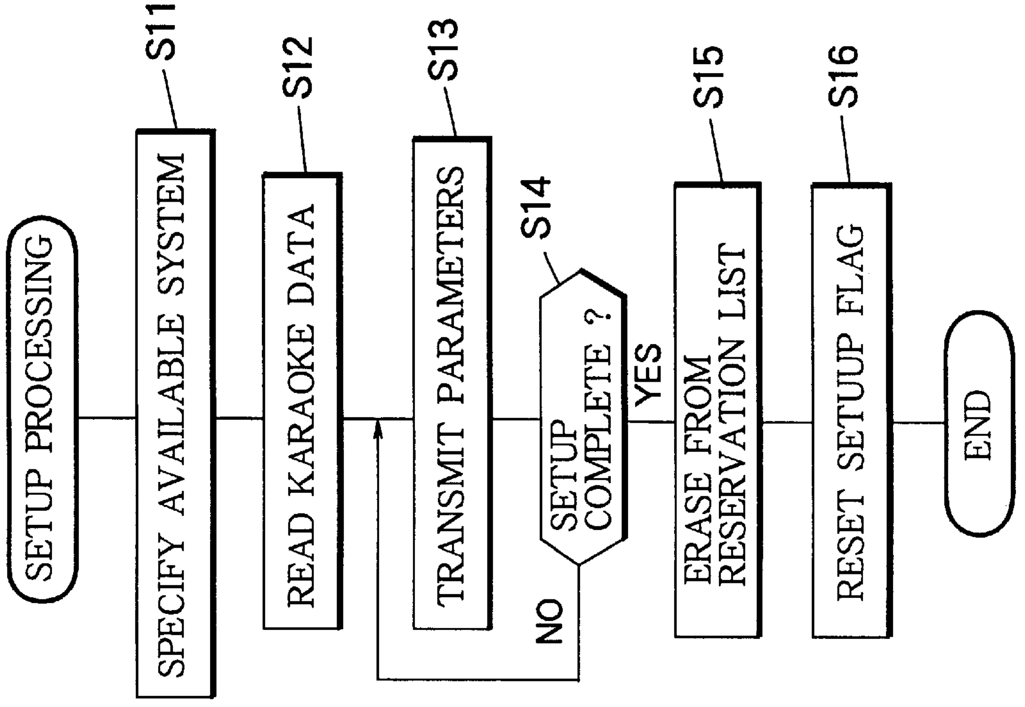
FIG. 4(A) is a flowchart describing operation of the karaoke apparatus of FIG. 1.
Figure 4B:
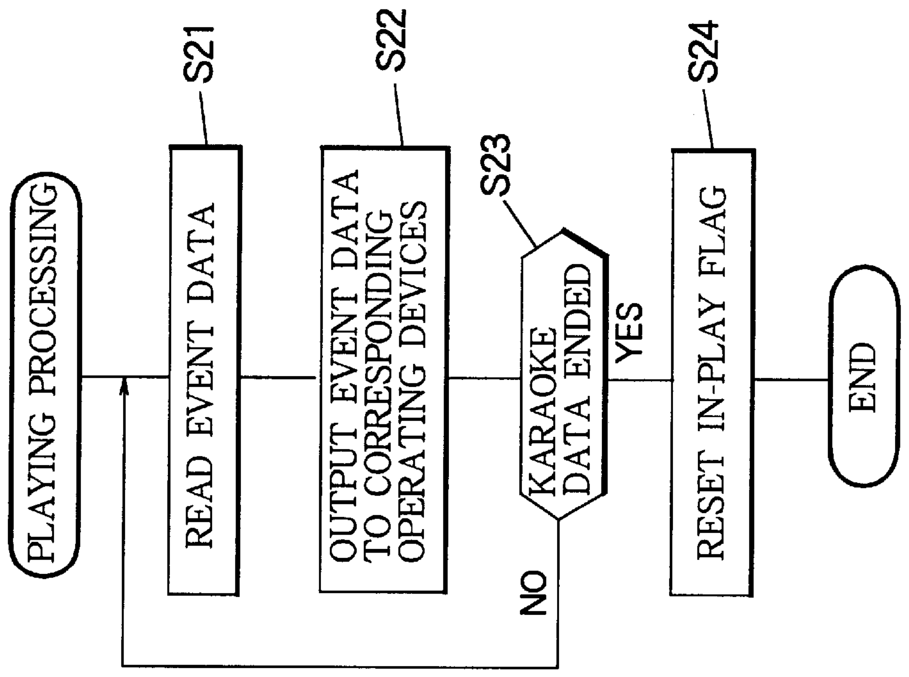
FIG. 4(B) is a flowchart describing operation of the karaoke apparatus of FIG. 1.
Figure 5:
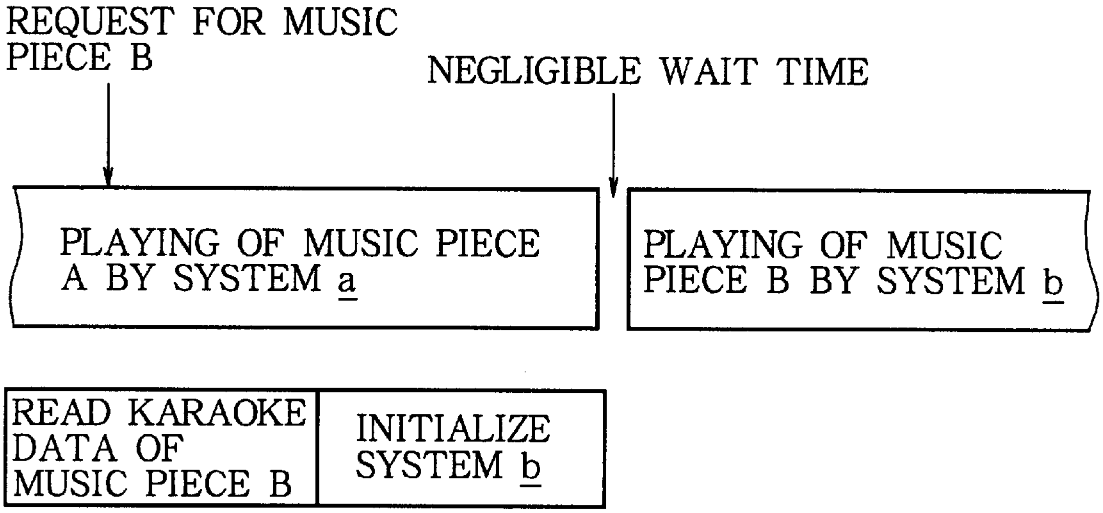
FIG. 5 is a diagram illustrating procedure of noninterruptive playing of a plurality of karaoke musical pieces.
Figure 6:
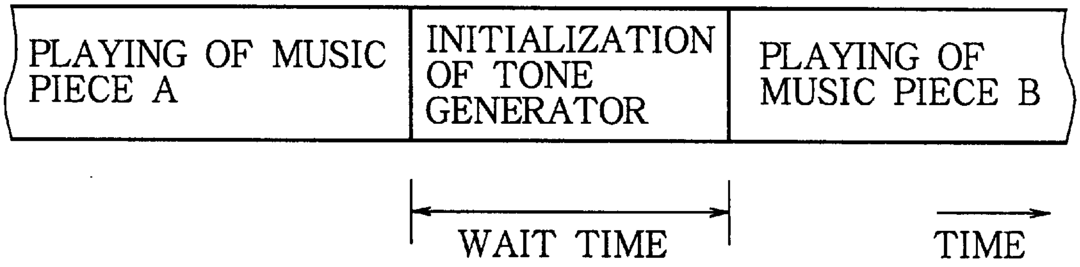
FIG.6 PRIOR ART
FIG. 6 is a diagram illustrating procedure of interruptive playing of a prior art karaoke apparatus.

Referring to FIGS. 3, 4(A) and 4(B), there are shown flowcharts describing operation of the karaoke apparatus according to the invention. FIG. 5 is a diagram illustrating procedure of continuous playing of karaoke music pieces. In this preferred embodiment, the reserved data area 12*a* of the RAM 12 is allotted to the sound source system a composed of the tone generator 19*a*, the chorus processor 20*a*, and the DSP 21*a*. The other reserved data area 12*b* is allotted to the other sound source system b composed of the tone generator 19*b*, the chorus processor 20*b*, and the DSP 21*b*.

Referring to FIG. 3, it is checked whether there is a request for a karaoke music piece or not in step S1. If a request is found, the same is registered in the reservation list in step S2. Next, it is checked whether there is an available one of the sound source systems in step S3. If one or both of the sound source systems is found available, a setup flag is set for the available system in step S9. When this flag is set, the setup processing shown in FIG. 4(A) is performed for the reserved piece of music. If neither of the sound source systems is found available in step S3, the process returns to a standby routine. If three or more pieces are reserved consecutively, both of the systems a and b are occupied by the first and second pieces, thereby disabling the third piece to be set up until the first piece has been finished. It should be noted that this setup processing is executed by multitask in parallel to the playing processing which is shown in FIG. 4(B).

Meanwhile, it is checked whether a piece of karaoke music is currently being played or reproduced by either of the sound source system in step S4. If it is found that the music piece is being played, the playing performance is continued as it is and the process returns to a standby routine. If no piece is being played, the available one of the sound source systems is set up for playing, and check is made as to whether there is any reserved piece of karaoke music that can be started immediately in step S5. If there is a music piece ready for playing, the system to which this piece is allocated is selected in step S6, and an in-play flag is set therefor in step S7. When the in-play flag is set, the playing processing shown in FIG. 4(B) is executed for the music piece by the specified system. Then, it is checked whether any reserved piece is registered in the reservation list in step S8. If the reserved piece is found, the setup flag is set in order to set up the reserved piece to the available system that has already finished the playing of a previous piece of karaoke music in step S9.

FIG. 4(A) is the flowchart describing the setup processing. First, the idling or available sound source system other than the working or busy sound source system currently playing karaoke music or already set up for playing is specified in step S11. The karaoke data are read into the reserved data area 12*a*/*b* allotted to the specified system in step S12. Next, the initializing control parameters contained in the karaoke data are read out from the reserved data area and transmitted to the tone generator 19*a*/*b* and the DSP 21*a*/*b* to set up these device components in step S13. When it is confirmed that these device components have been set up in step S14, the code data of this piece of karaoke music is erased from the reservation list in step S15. Then, the setup flag is reset in step S16, upon which the operation terminates.

FIG. 4(B) is the flowchart describing the playing processing. In step S21, the note event data are read out sequentially according to the tempo clock and the delta time data from the reserved data area 12*a*/*b* allotted to the system specified in step S6. In step S22, the read event data are outputted to the corresponding operating sections such as the tone generator 19*a*/*b* and the DSP 21*a*/*b*. This operation is repeated until this piece of music comes to an end in step S23. Upon termination of the music piece, the in-play flag is reset in step S24 to end the operation.

Now, referring to FIG. 5, the above-mentioned concurrent and parallel processings will be described in the order of time sequence. It is assumed that there is a first request for a karaoke music piece A, that the karaoke data of the piece A is read into the reserved data area 12*a*, and that the piece A is currently in play. If a second request for another karaoke musical piece B is made while the piece A is being played or made at substantially the same time as the piece A is requested, the karaoke data of the piece B are read into the reserved data area 12*b*. Next, the initializing parameters for setting up the tone generator 19*b* and the DSP 21*b* are read from the musical sound track and the DSP control track, respectively, and are transmitted to the tone generator 19*b* and the DSP 21*b*. The tone generator 19*b* and the DSP 21*b* set the received parameters to corresponding registers, and perform predetermined computation based on these parameters to complete the setup operation. Thus, the tone generator 19*b* and the DSP 21*b* are customized to the music piece B. It takes about 10 seconds to perform this customizing operation. Then, the sound source system b is kept in the standby state until the playing by the system a comes to an end. When the playing of the music piece A by the system a comes to an end, the playing of the piece B by the system b starts immediately or after one to two seconds. Thus, at the end of the playing of the piece A, the playing of the piece B is ready to start without undue wait. If desired, the ending of the piece A can be cross-faded with the introduction of the piece B to eliminate a wait time.

As described, the present invention provides continuous or noninterruptive playing of plural pieces of karaoke music by the two sound source systems without any undue wait. Provision of the two sound source systems for separately and independently synthesizing the musical sound allows the karaoke apparatus to achieve the following additional capabilities:

(1) An external MIDI input terminal may be provided on the karaoke apparatus. One of the two sound source systems is connected to this external MIDI input terminal. This arrangement provides full-channel playing by an external MIDI device such as an electronic musical instrument connected to the external MIDI input terminal during the course of the karaoke playing by the karaoke apparatus, thereby realizing an ensemble between the karaoke apparatus and the external MIDI device.

(2) Recent karaoke apparatuses are constructed to provide various service information such as commercials, concert guides, sports report, and games such as a bingo for the entertainment of karaoke users by using an idling time in which no karaoke musical piece is requested by the karaoke users. The karaoke apparatus according to the invention can play background music for these service information and games. One of the sound source systems is used for this BGM purpose, and the other system is used for sounding confirmation tones for key switch operations when ordering a concert ticket or else and for providing sound effects for games. This arrangement can improve a quality of background musics and sound effects.

As described above, according to the invention, a plurality of sound source systems composed of tone generators and so on are provided and a plurality of karaoke musical pieces are continuously played back by these alternate systems. This novel constitution allows a succeeding piece of karaoke music to be made ready for playing while a preceding piece of karaoke music is being played. This setup operation for continuous playing requires about 10 seconds, but is completed in advance. Therefore, playing of the next piece of music can be started as soon as the playing of the preceding piece ends, thereby eliminating an unnecessary wait interval between the pieces of karaoke music to thereby ensure continuous and smooth karaoke playing.

Figure 7:
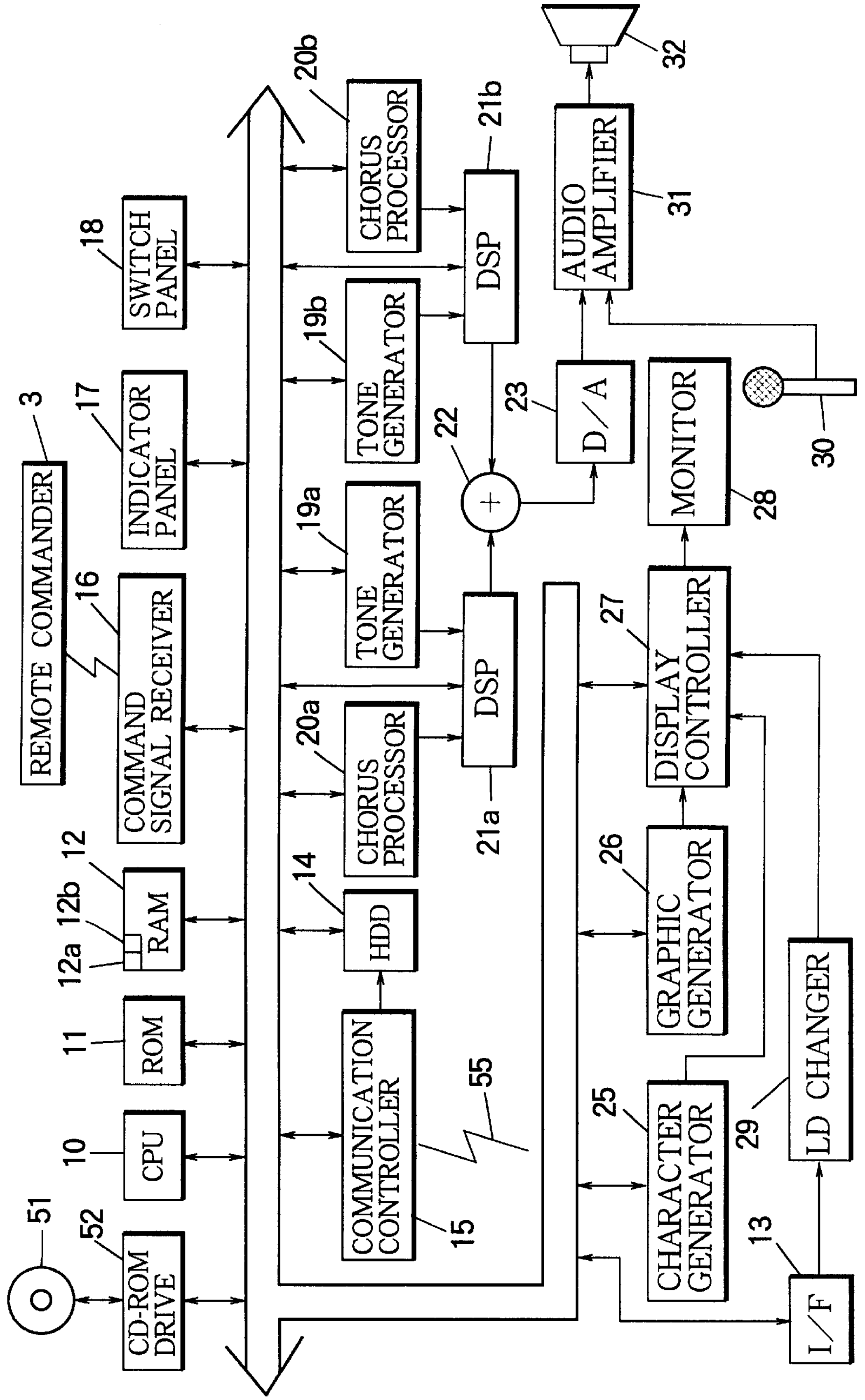
FIG. 7 is a block diagram showing another embodiment of the inventive karaoke apparatus.

FIG. 7 shows an additional embodiment of the inventive karaoke apparatus. This embodiment has basically the same construction as the previous embodiment shown in FIG. 1. The same components are denoted by the same references as those of the previous embodiment to facilitate better understanding of the additional embodiment. The storage such as ROM 11, RAM 12 and HDD 14 can store various data such as karaoke data and various programs including the system control program or basic program, the tone generating program and other application programs. Normally, the ROM 11 provisionally stores these programs. However, if not, any program may be loaded into the karaoke apparatus. The loaded program is transferred to the RAM 12 to enable the CPU 10 to operate the inventive sound source systems a and b of the karaoke apparatus. By such a manner, new or version-up programs can be readily installed in the karaoke apparatus. For this purpose, a machine-readable media such as a CD-ROM (Compact Disc Read Only Memory) 51 is utilized to install the program. The CD-ROM 51 is set into a CD-ROM drive 52 to read out and download the program from the CD-ROM 51 into the HDD 14 through the bus. The machine-readable media may be composed of a magnetic disk or an optical disk other than the CD-ROM 51.

A communication controller 15 is connected to an external server computer (not shown) through a communication network 55 such as LAN (Local Area Network), public telephone network and INTERNET. If the internal storage does not reserve needed data or program, the communication controller 15 is activated to receive the data or program from the server computer. The CPU 10 transmits a request to the server computer through the communication controller 15 and the network 55. In response to the request, the server computer transmits back the requested data or program to the karaoke apparatus. The transmitted data or program is stored in the storage to thereby complete the downloading.

The inventive karaoke apparatus can be implemented by a personal computer which is installed with the needed data and programs. In such a case, the data and programs are provided to the user by means of the machine-readable media such as the CD-ROM 51 or a floppy disk. The machine-readable media contains instructions for causing the personal computer to perform the inventive musical tone generating method as described in conjunction with the previous embodiment. Namely, the machine readable media 51 contains instructions for causing the karaoke apparatus to perform a method of reproducing a karaoke music piece according to karaoke data composed of setup data and performance data by means of a pair of sound source systems a and b, each of which is initialized according to the setup data and is then operated to reproduce the karaoke music piece according to the performance data so that the sound source systems a and b can be alternately operated with each other to successively reproduce a plurality of karaoke music pieces. The method comprises the steps of controlling when one sound source system a reproduces a preceding one of the karaoke music pieces to provide the other sound source system b with setup data contained in karaoke data corresponding to a succeeding one of the karaoke music pieces so as to initialize the other sound source system b before the one sound source system a finishes reproduction of the preceding karaoke music piece, and controlling when the one sound source system a finishes the reproduction of the preceding karaoke music piece to provide the other sound source system b with performance data contained in the karaoke data corresponding to the succeeding karaoke music piece so as to operate the other sound source system b to reproduce the succeeding karaoke music piece immediately after the one sound source system a finishes the reproduction of the preceding karaoke music piece.

In a specific form, the sound source system b includes a tone generator 19*b* which generates musical tones having suitable timbres arranged in matching with the karaoke music piece to be reproduced by the sound source system b so that a first control device composed of a CPU 10 provides the sound source system b with the setup data effective to initialize the tone generator 19*b* to create the suitable timbres, and a second control device composed also of the CPU 10 provides the sound source system b with the performance data effective to operate the tone generator 19*b* to generate the musical tones having the suitable timbres to thereby reproduce the karaoke music piece. Further, the sound source system b includes a digital signal processor 21*b* which imparts suitable effects to the karaoke music piece to be reproduced by the sound source system b so that the first control device provides the sound source system b with the setup data effective to initialize the digital signal processor 21*b* to create the suitable effects. Moreover, the karaoke apparatus further comprises a reservation device including a commander 3 and a RAM 12, which reserves requests for a plurality of karaoke music pieces and which commands the first control device and the second control device implemented in the CPU 10 to alternately operate the pair of the sound source systems a and b to successively reproduce the reserved karaoke music pieces in the order of the requests.

While the preferred embodiments of the present invention has been described using specific terms, such description is for illustrative purposes only, and it is to be understood that changes and variations may be made without departing from the spirit or scope of the appended claims.

What is claimed is:

1. A karaoke apparatus constructed to reproduce a karaoke music piece according to karaoke data composed of setup data and performance data, comprising:

a plurality of sound source devices each of which is initialized according to the setup data and is then operated to reproduce the karaoke music piece according to the performance data so that the sound source devices can be alternately operated with each other to successively reproduce a plurality of karaoke music pieces;

a first control device operative when one of the sound source devices reproduces a preceding one of the karaoke music pieces for providing another of the sound source devices with setup data contained in karaoke data corresponding to a succeeding one of the karaoke music pieces so as to initialize said another sound source device before said one sound source device finishes reproduction of the preceding karaoke music piece; and a second control device operative when said one sound source device finishes the reproduction of the preceding karaoke music piece for providing said another sound source device with performance data contained in the karaoke data corresponding to the succeeding karaoke music piece so as to operate said another sound source device to reproduce the succeeding karaoke music piece immediately after said one sound source device finishes the reproduction of the preceding karaoke music piece.

2. A karaoke apparatus according to claim 1, wherein each sound source device includes a tone generator which generates musical tones having suitable timbres arranged in matching with the karaoke music piece to be reproduced by each sound source device so that the first control device provides each sound source device with the setup data effective to initialize the tone generator to create the suitable timbres and the second control device provides each sound source device with the performance data effective to operate the tone generator to generate the musical tones having the suitable timbres to thereby reproduce the karaoke music piece.

3. A karaoke apparatus according to claim 1, wherein each sound source device includes a digital signal processor which imparts suitable effects to the karaoke music piece to be reproduced by each sound source device so that the first control device provides each sound source device with the setup data effective to initialize the digital signal processor to create the suitable effects.

4. A karaoke apparatus according to claim 1, further comprising a reservation device which reserves requests for a plurality of karaoke music pieces and which commands the first control device and the second control device to alternately operate the plurality of the sound source devices to successively reproduce the reserved karaoke music pieces in the order of the requests.

5. A karaoke apparatus constructed to reproduce a karaoke music piece according to karaoke data representative of control parameters and note events, comprising:

a plurality of sound source means each of which is reset according to the control parameters and is then operated to reproduce the karaoke music piece according to the note events so that the plurality of the sound source means can be alternately operated with each other to successively reproduce a plurality of karaoke music pieces;

first control means operative when one of the sound source means reproduces a preceding one of the karaoke music pieces for providing another of the sound source means with control parameters contained in karaoke data corresponding to a succeeding one of the karaoke music pieces so as to reset said another sound source means before said one sound source means finishes reproduction of the preceding karaoke music piece; and second control means operative when said one sound source means finishes the reproduction of the preceding karaoke music piece for providing said another sound source means with note events contained in the karaoke data corresponding to the succeeding karaoke music piece so as to operate said another sound source means to reproduce the succeeding karaoke music piece immediately after said one sound source means finishes the reproduction of the preceding karaoke music piece.

6. A method of reproducing a karaoke music piece according to karaoke data composed of setup data and performance data by means of a plurality of sound source devices each of which is initialized according to the setup data and is then operated to reproduce the karaoke music piece according to the performance data so that the sound source devices can be alternately operated with each other to successively reproduce a plurality of karaoke music pieces, the method comprising the steps of:

controlling when one of the sound source devices reproduces a preceding one of the karaoke music pieces to provide another of the sound source devices with setup data contained in karaoke data corresponding to a succeeding one of the karaoke music pieces so as to initialize said another sound source device before said one sound source device finishes reproduction of the preceding karaoke music piece; and controlling when said one sound source device finishes the reproduction of the preceding karaoke music piece to provide said another sound source device with performance data contained in the karaoke data corresponding to the succeeding karaoke music piece so as to operate said another sound source device to reproduce the succeeding karaoke music piece immediately after said one sound source device finishes the reproduction of the preceding karaoke music piece.

7. A machine readable media containing instructions for causing a karaoke apparatus to perform a method of reproducing a karaoke music piece according to karaoke data composed of setup data and performance data by means of a plurality of sound source devices each of which is initialized according to the setup data and is then operated to reproduce the karaoke music piece according to the performance data so that the sound source devices can be alternately operated with each other to successively reproduce a plurality of karaoke music pieces, the method comprising the steps of:

controlling when one of the sound source devices reproduces a preceding one of the karaoke music pieces to provide another of the sound source devices with setup data contained in karaoke data corresponding to a succeeding one of the karaoke music pieces so as to initialize said another sound source device before said one sound source device finishes reproduction of the preceding karaoke music piece; and controlling when said one sound source device finishes the reproduction of the preceding karaoke music piece to provide said another sound source device with performance data contained in the karaoke data corresponding to the succeeding karaoke music piece so as to operate said another sound source device to reproduce the succeeding karaoke music piece immediately after said one sound source device finishes the reproduction of the preceding karaoke music piece.

* * * * *